United States Patent
Weinberg et al.

(10) Patent No.: US 7,917,368 B2
(45) Date of Patent: Mar. 29, 2011

(54) METHOD FOR INTERACTING WITH USERS OF SPEECH RECOGNITION SYSTEMS

(75) Inventors: Garrett Weinberg, Watertown, MA (US); Bhiksha Ramakrishnan, Watertown, MA (US); Bent Schmidt-Nielsen, Lexington, MA (US); Bret A. Harsham, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 622 days.

(21) Appl. No.: 12/036,713

(22) Filed: Feb. 25, 2008

(65) Prior Publication Data

US 2009/0216538 A1     Aug. 27, 2009

(51) Int. Cl.
*G10L 21/00*     (2006.01)
*G10L 15/00*     (2006.01)

(52) U.S. Cl. ............. 704/275; 704/9; 704/257

(58) Field of Classification Search ............... 704/275
See application file for complete search history.

(56) References Cited

U.S. PATENT DOCUMENTS

| | | | |
|---|---|---|---|
| 6,877,001 B2 | 4/2005 | Wolf | |
| 7,089,188 B2 * | 8/2006 | Logan et al. | 704/270 |
| 2004/0193420 A1 * | 9/2004 | Kennewick et al. | 704/257 |
| 2009/0094030 A1 * | 4/2009 | White | 704/246 |

FOREIGN PATENT DOCUMENTS

WO     2005024781 A1     3/2005

* cited by examiner

*Primary Examiner* — Vincent P Harper
(74) *Attorney, Agent, or Firm* — Dirk Brinkman; Gene Vinokur

(57) ABSTRACT

A computer implemented method facilitates a user interaction via a speech-based user interface. The method acquires spoken input from a user in a form of a phrase of one or more words. It further determines, using a plurality of different domains, whether the phrase is a query or a command. If the phrase is the query the method retrieves and presents relevant items from a plurality of databases. If the phrase is a command, the method performs an operation.

6 Claims, 6 Drawing Sheets

METHOD FOR INTERACTING WITH USERS OF SPEECH RECOGNITION SYSTEMS

RELATED APPLICATION

This patent application is related to U.S. patent application Ser. No. 12/036,681 "Method for indexing for retrieving documents using particles," co-filed herewith by Ramakrishnan et al. on Feb. 25, 2008, and incorporated herein in its entirety.

FIELD OF THE INVENTION

The invention relates generally to automatic speech recognition systems, and more specifically to a user interaction interface for such a system.

BACKGROUND OF THE INVENTION

Applications that use automatic speech recognition (ASR) require a speech-based user interface to interact with users. Generally, users can perform two types of tasks using spoken user input. The first task type relates to information retrieval (IR) with a query. In this tasks, the user wishes to retrieve an item, e.g., a document, image, recording, from a large collection of items stored in a database, e.g., the web of the Internet. The other task type is for speech enabled command and control. Here, the user wishes to perform some operation. Both tasks involve a "narrowing down" of the possibilities of what the user might have said.

In the case of IR, this is often accomplished through dialogs as shown in FIG. 1, where the vertical axis indicates time. In FIG. 1, the riser 101 steps are shown in the left, and the system 102 steps on the right. The system has some root state R 120. The user to 101 provides spoken input 110, e.g. to search for an item. The spoken input 110 is interpreted 122 as relevant to state set X 124, rather than as relevant to some other state sets Y and Z 123. In response the system enters a next state $X_0$ 125, and perhaps, prompts the user.

The user provides additional input 110. For example, in a voice-based destination entry system, the user might first be required to select a country, and then, in a separate step, a city, before being allowed to say a destination street name. The process 124 iterates and continues with the system changing 126 states 128-129, until the interaction is complete and the relevant item 127 is retrieved.

Typically, every system state has a limited, state-specific grammar, vocabulary, and/or language model, and states such as 128-129 are reachable only via a multi-step process involving the traversal of two or more application states in a finite-state machine (FSM).

As shown in FIG. 2, a command-oriented approach often involve "carrier" phrases, wherein command words are present in the same phrases 130 as certain modifier words and/or variables. The system interprets 122 the meaning of the carrier phrase given as modifiers and variables within the phrase 130 and enters state set X 124. If the carrier phrase is relevant to for some example state $X_1$ 129, the system may either immediately enter that state, or request confirmation 132 from the user before entering that state. Confirmation or cancellation 137 on the user's part 133 could be accomplished using verbal or physical interaction modalities 139. The process 124 can iterate as before.

Other approaches are also common. For example, a variable can be spoken without a command, or a command can initiate a dialog state in which only the variables are available. Search tasks can also be accomplished using carrier words, such as in the phrase "find artist Vanilla Ice." In each case, however, the vocabularies, phrase grammars and/or language models for each state are fixed.

In general, the two different interfaces are incompatible with each other. That is, an IR interface cannot process commands, and a control interface cannot process queries.

SUMMARY OF THE INVENTION

A speech interface acquires spoken input in a form of a phrase of one or more words. A determination is made whether the phrase is a query or a command. Relevant items as specified by the phrase are retrieved from a database if the phrase is a query, otherwise an operation is performed if the phrase is a command.

DETAILED DESCRIPTION OF THE PREFERRED EMBODIMENTS

The embodiments of our invention provide a method for interacting with a user via a speech-based interface. Arbitrary spoken input can be pertinent either to information retrieval or to command and control, where the latter can include selecting among menus or functional hierarchies.

In contrast with conventional spoken user interfaces that have a limited vocabulary and grammar, our interface has essentially an unlimited vocabulary and grammar. This means that any words can be spoken in any order. This greatly enhances the flexibility and efficiency of operation of the spoken interface.

Interface Structure and Operation

Figure 1:
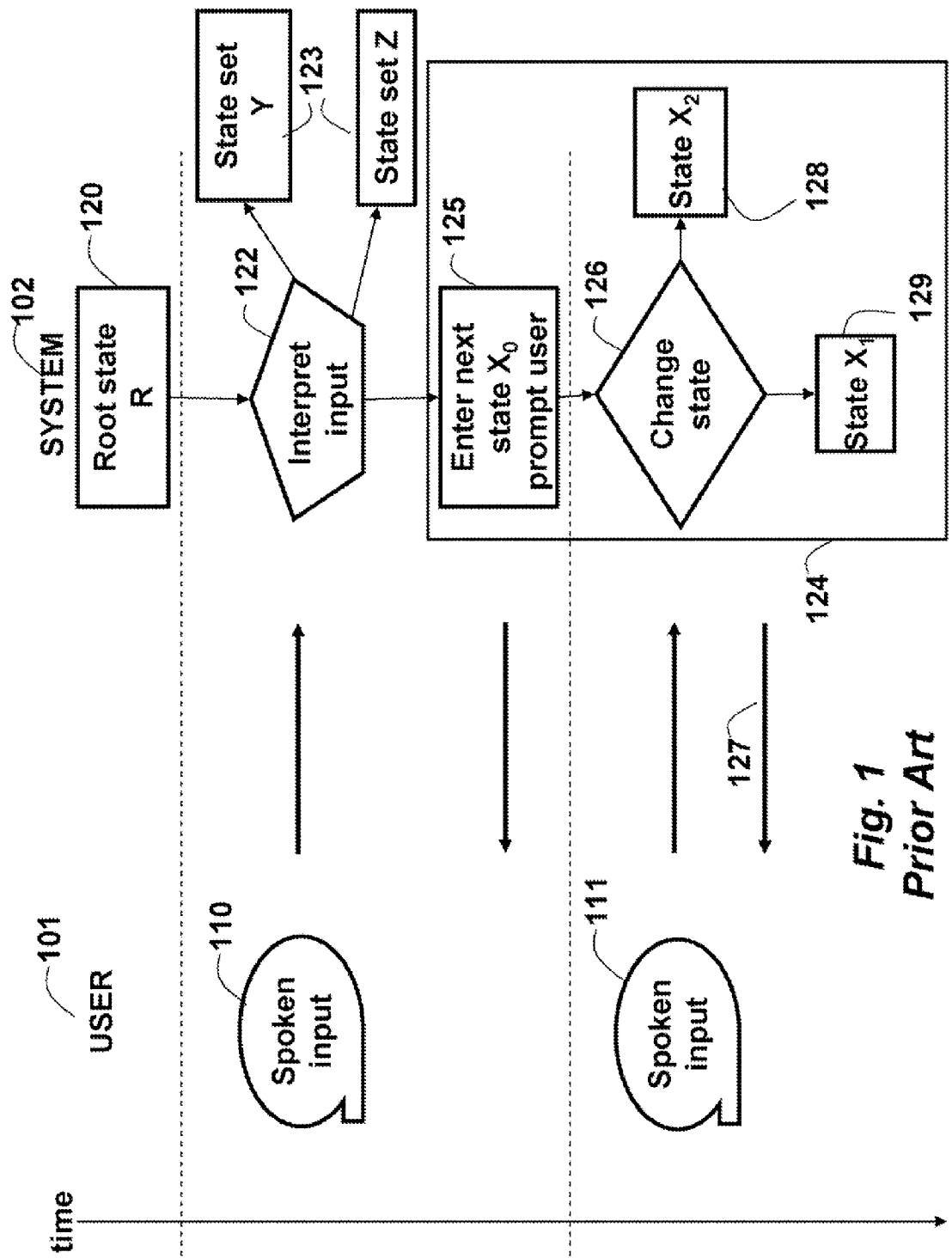
FIG. 1 is a block diagram of a prior art speech-based interface for information retrieval.
Figure 2:
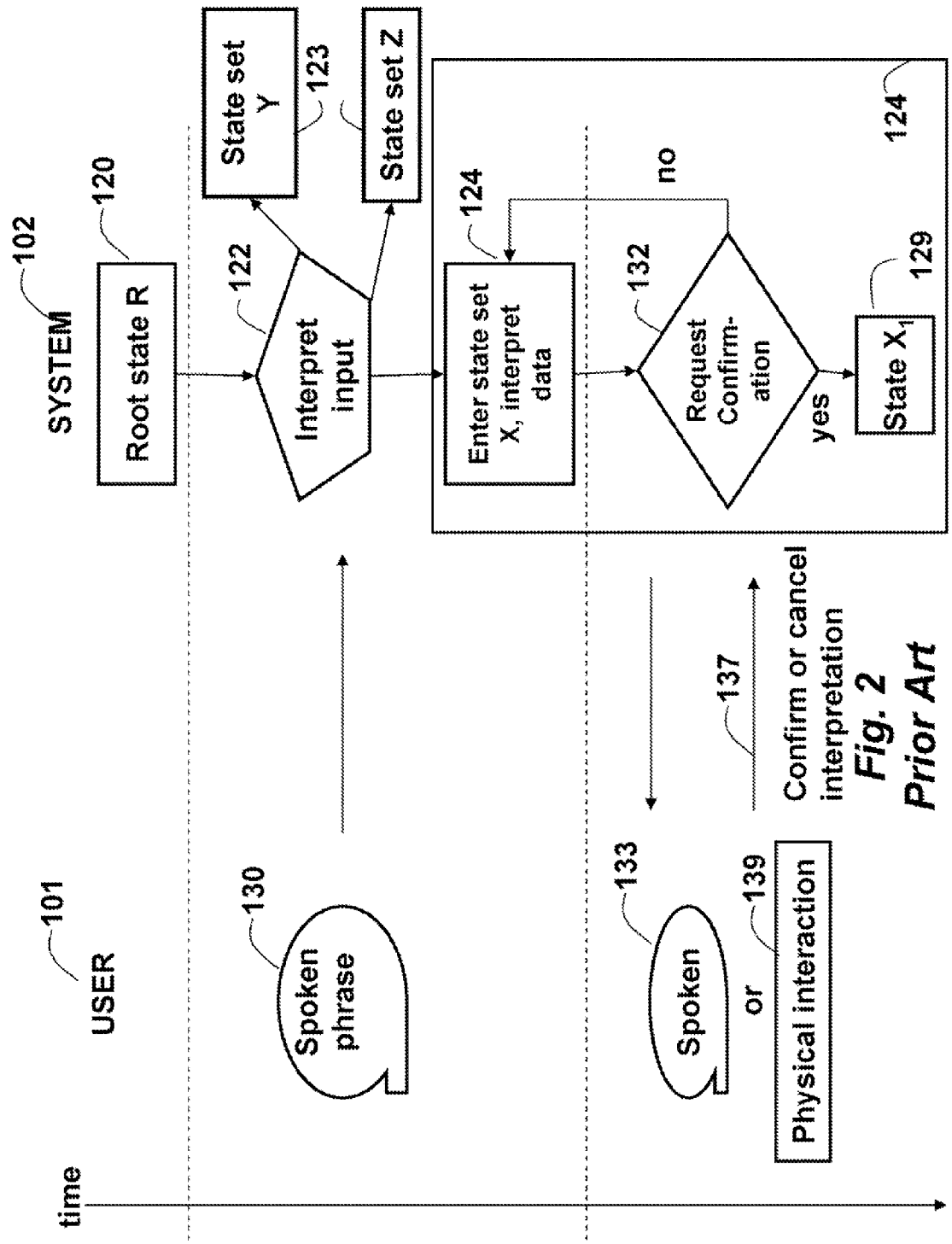
FIG. 2 is a block diagram of a prior art speech-based interface for command and control.
Figure 3:
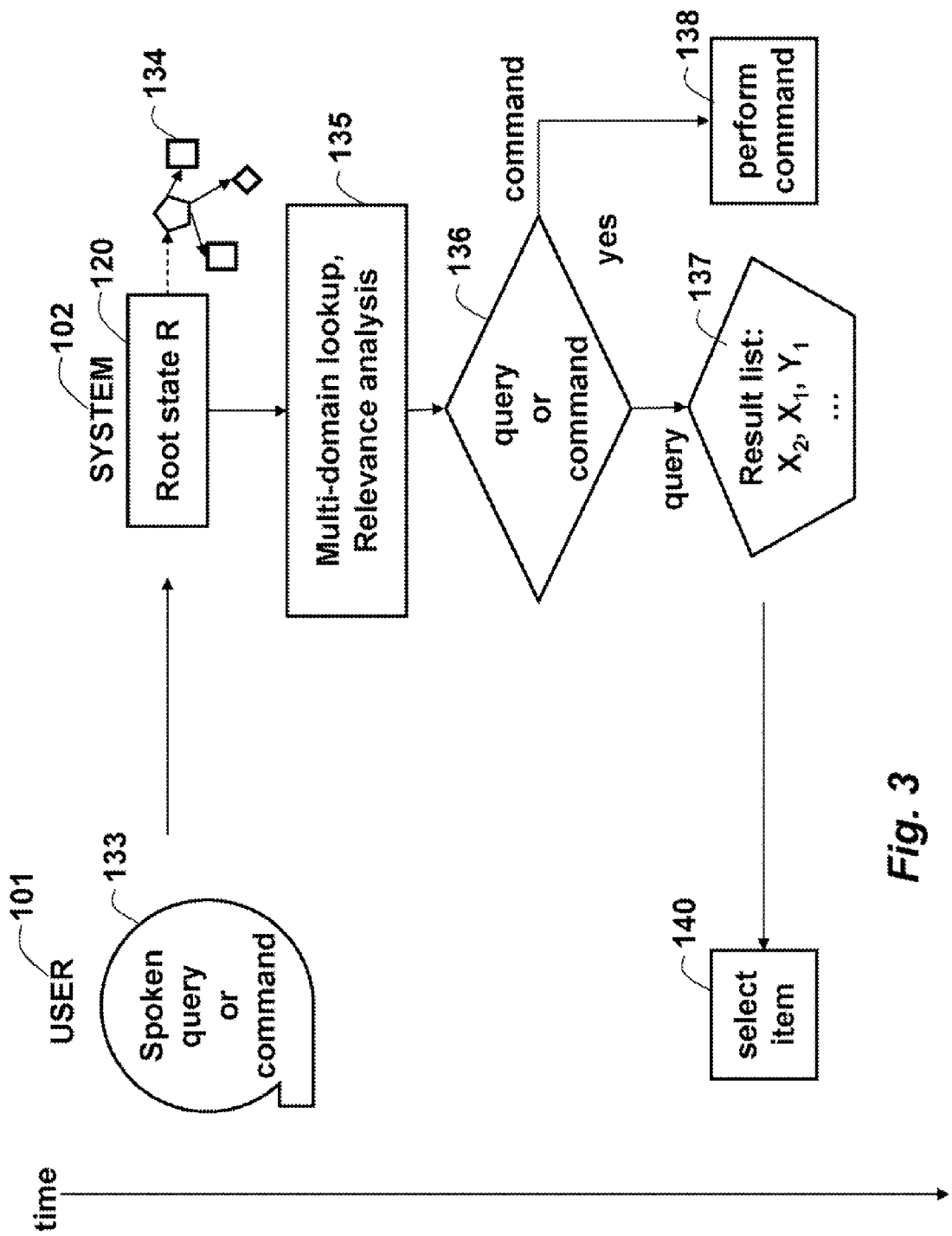
FIG. 3 is a block diagram of a spoken user interface according to an embodiment of the invention.

FIG. 3 shows the speech-based user interface according to an embodiment of the invention. The vertical axis represents time. User 101 operations are shown on the left, and system 102 operations on the right.

The user initiates an interaction by providing unstructured or semi-structured spoken input 133 in a form of a phrase of one or more words. Unlike conventional interfaces, the input can be either a query or a command.

Variables and modifiers may be included in the command phrase in addition to command words. That is, the interface allows the user to say anything.

Rather than entering a finite state machine (FSM) 124 as in conventional interfaces, the system performs a sequence of multi-domain lookups and relevance analysis 135 on the spoken input using a speech-based IR system, such as described in U.S. Pat. No. 6,877,001, incorporated herein by reference in its entirety.

The spoken input, as well as any underlying indices and databases can use particles as described and shown in the co-pending and related U.S. patent application Ser. No. 12/036,681. The lookups and relevance scoring occur within various domains, some of which pertain to commands, as in a conventional command-and-control interface, and others of which pertain to searchable content such as a document or music collection, or points of interest (POI) in a navigation system.

States within different functional areas of the application, for example audio/visual and navigation, can be indexed separately, forming one or more distinct command domains.

Command and Query Domains

In the case of command domains, the "items" retrieved by the IR engine are pointers to a given FSM state, and the items may include information about any inputs expected by this state and other states reach able from the state of the item. If inputs are required that are not included in the IR index for the command item, then the inputs can be extracted either by re-recognizing the speech input against a conventional finite state grammar (FSG), which includes placeholders for variables and/or modifiers, or by prompting the user for additional clarifying input.

In the case of content domains, the "items" retrieved are pointers to individual nodes of searchable content, such as artists, albums, or songs in a music collection, or nearby restaurant POIs.

The system determines 136 whether the spoken input is either a query or a command. If the best-matching domain is in a content domain, then a result list 137 is presented to the user and the user selects 140 which content item to activate. If the input phrase is a command, then the best-matching command or commands can be presented to the user for confirmation, or can be performed 138 immediately if there is an unambiguously best-matching command. If necessary, additional phrases can be input to refine or complete either commands or queries.

Result Presentation

Relevant commands or relevant items can be presented to the user in a number of different ways. Relevant matches from different domains can be segregated on a domain-by-domain basis, with domains appearing in either the same order every time, or in decreasing order of relevance to a given query. Alternatively, matches from all domains can be commingled into a combined result list.

Relevant Domain Determination

Any speech input phrase is likely match in each of the domains. To determine a most relevant domain for the input phrase, we determine which of the matches are least likely to have been obtained by a random draw. The likelihoods can be computed conventionally.

Figure 4:
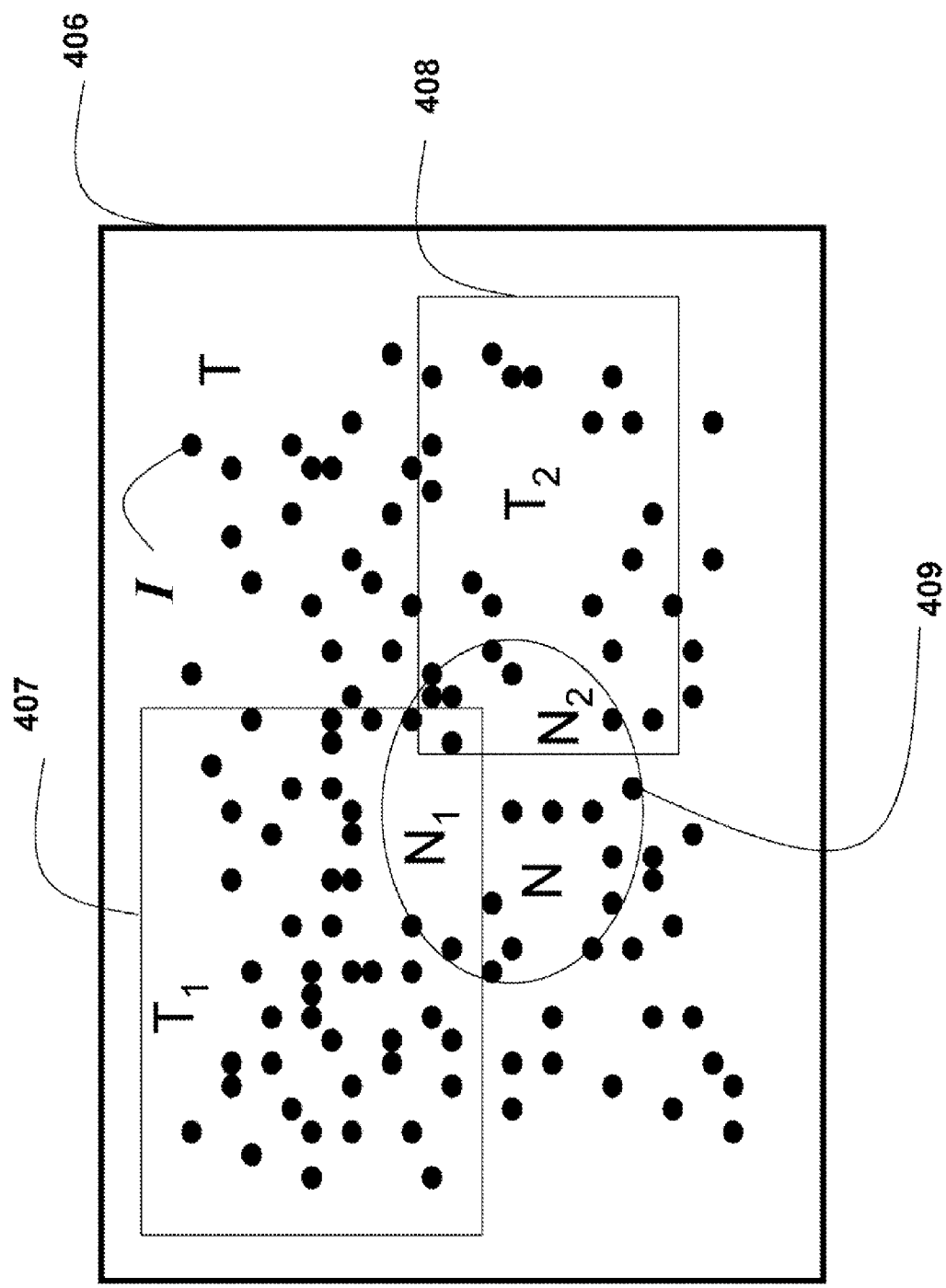
FIG. 4 is a schematic of domains according to the embodiments of the invention.
Figure 5:
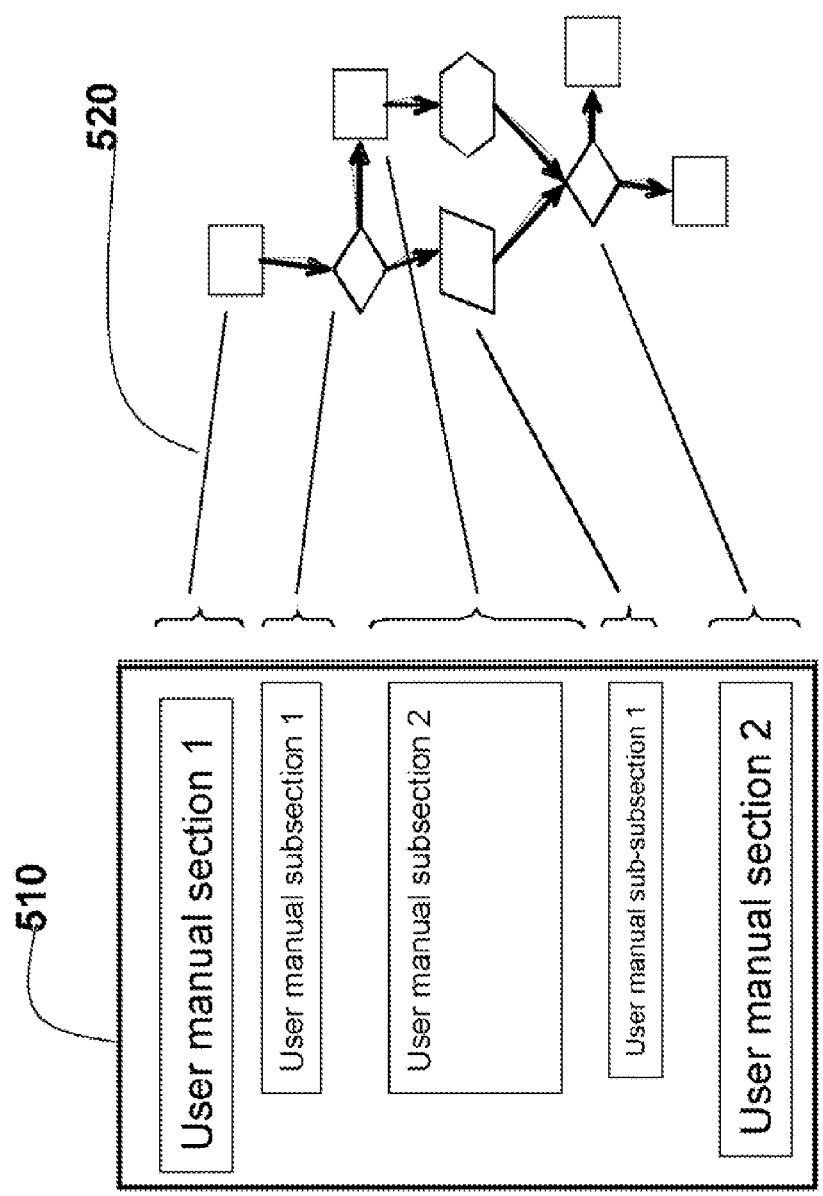
FIG. 5 is a schematic of a process for constructing the domains of FIG. 4.

FIG. 4 shows a set of items I 406 in all domains. The number of items I in the set is T. Subsets $I_1$, $I_2$, etc. represent items from domains 1, 2, etc., and $T_1$, $T_2$, etc. represent the number of items in each of these subsets. The subsets can intersect, see subset 407-408.

A user input phrase U retrieves N items, in which $N_1$ items are from subset $I_1$, $N_2$ from subset $I_2$, and so on. In order to determine the relevance of these retrievals, we determine a probability $P_1^{rand}(N_1, N)$. This is, if we were to draw randomly N items from the set I, then $N_1$ of the items would be from the subset $D_1$.

Similarly, we determine a probability $P_2^{rand}(N_2, N)$. This is, if we were to randomly draw of N documents from the set I, then N2 would belong to subset I2. In general, the probability $P_i^{rand}(N_i, N)$ is the probability that the number of items obtained from the $i^{th}$ domain could also have been obtained by a random draw of N documents from the set I. Then, the domain for the input phrase U has a smallest probability $P_i^{rand}(N_i, N)$, i.e., $$\text{Domain}(U) = \text{argmin}_i P_i^{rand}(N_i, N).$$

The above method determines which of the domains is least likely to have been obtained randomly, and the corresponding domain is selected as the most relevant domain for the input phrase. Furthermore, additional thresholds on the probability can be applied to reject an input phrase altogether.

Other variants of the above method are also possible that factor in the actual probability of drawing N documents randomly, or which use upper or lower bound on $P_i^{rand}(N_i, N)$ within the formula.

Construction of Document-Based Domains

Items in the domains can be constructed by indexing each item, as described in the related U.S. Application. For example, the item is a textual document such as an operator's manual 510. The document can be explicitly or implicitly formatted, and may be provided in either machine-readable or human-readable forms. The indexing process partitions the document into smaller sections 520, and identifies terms or phrases likely to be spoken by a user retrieving a given section.

There are several means by which the terms can be identified using the structure of the document, such as chapter titles and sub-chapters. Statistics on the occurrence of word and phrase can be compiled, as a whole, as well as for each section. Weights can be assigned to terms on a per-section basis, respective of the document as a whole. This enables the identification of more relevant terms for the purposes of IR.

A hand- or machine-generated "stop list" of unimportant terms, such as very short or common words, e.g., "the", can be incorporated. However, if a term on the stop list is found to occur with a high frequency in certain sections but not others, it is moved from the stop list to a list of relevant terms.

Relevant or distinguishing terms that appear in chapter or sub-chapter titles can be looked up in a synonym dictionary, and if found, such synonyms are also added to the relevant and distinguishing terms list for a given section.

Figure 6:
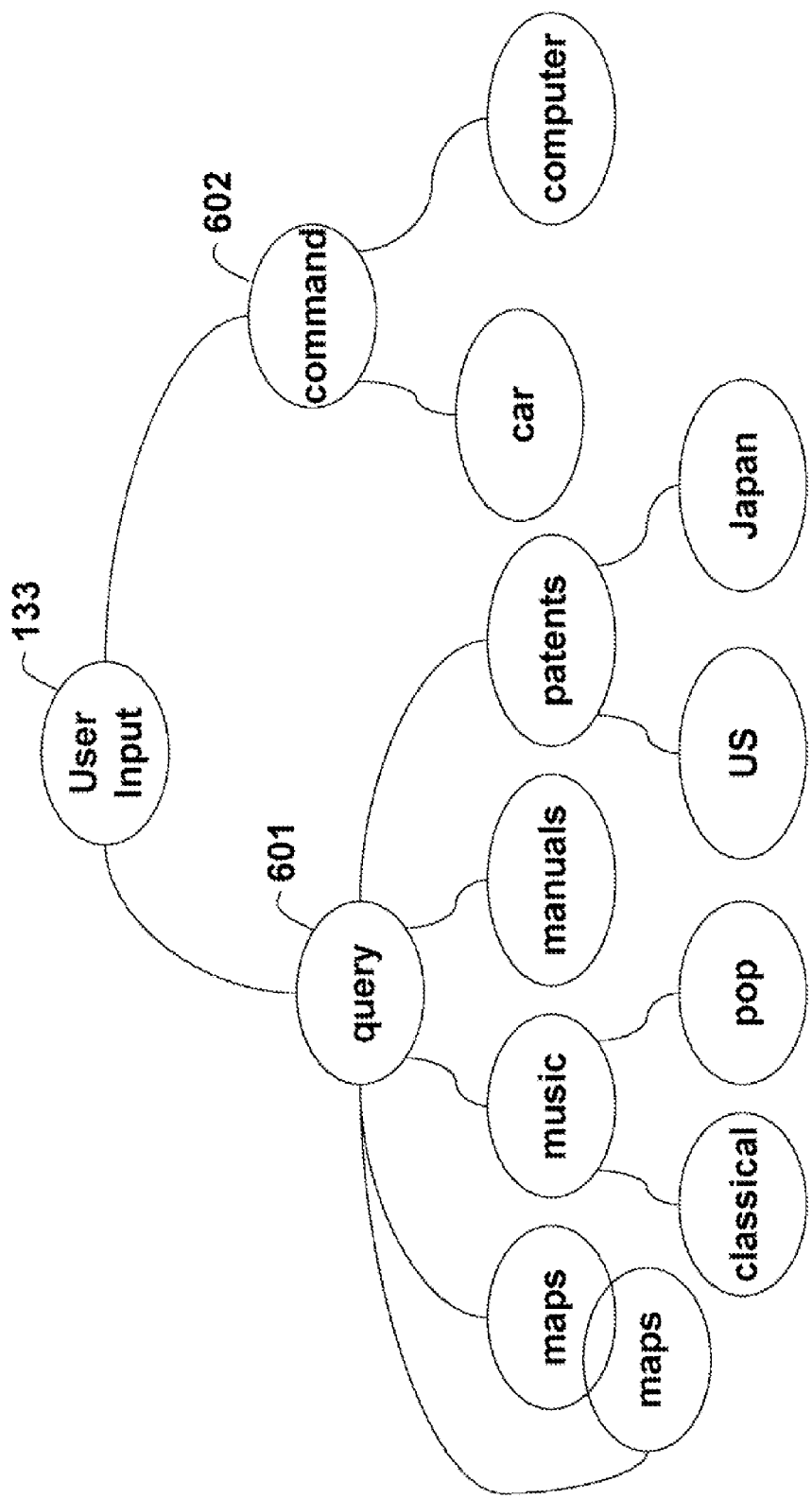
FIG. 6 is a schematic of an example domain structure according to an embodiment of the invention.

FIG. 6 shows a domain structure in hierarchical form with user input 133, a set of search domains 610 and a set of command domains 620, and various subsets of items, some which can intersect.

Although the invention has been described by way of examples of preferred embodiments, it is to be understood that various other adaptations and modifications may be made within the spirit and scope of the invention. Therefore, it is the object of the appended claims to cover all such variations and modifications as come within the tree spirit and scope of the invention.

We claim:

1. A computer implemented method for interacting with a user via a speech-based user interface, comprising the steps of:

acquiring spoken input from a user in a form of a phrase of one or more words;

determining, using a plurality of different domains, whether the phrase is a query or a command; and retrieving and presenting relevant items from a plurality of databases if the phrase is the query; and otherwise performing an operation if the phrase is a command, and wherein all possible items form a set of items, and further comprising:

grouping items in the set into subsets of items, in which each subset of items forms one of the plurality of domains;

retrieving the items from one or more of the plurality of domains in response to the query; and selecting a particular domain as most relevant to the query if the retrieved items are least likely to have been obtained by random draw from the entire set of items.

2. The method of claim 1, in which the phrase includes variables and modifiers if the phrase is the command.

3. The method of claim 1, in which the phrase is in a form of particles, and an index to the items is in the form of the particles.

4. The method of claim 1, in which the relevant items are segregated on a domain-by-domain basis.

5. The method of claim 1, in which the relevant items are presented in a relevance order.

6. The method of claim 1, in which the relevant items coming led in a combined result list.

\* \* \* \* \*